United States Patent Office 3,352,855
Patented Nov. 14, 1967

3,352,855
17 - OXYGENATED 4 - HALO - 2 - METHYLENE
(ANDROST/ESTR) - 4 - EN - 3 - ONES AND
INTERMEDIATES
Ivar Laos, Skokie, Ill., assignor to G. D. Searle & Co.,
Chicago, Ill., a corporation of Delaware
No Drawing. Filed Feb. 23, 1966, Ser. No. 529,195
8 Claims. (Cl. 260—239.55)

This invention relates to 17 - oxygenated 4 - halo - 2-methylene(androst/estr)-4-en-3-ones and intermediates, and to processes for the preparation thereof. More particularly, this invention provides new, useful, and unobvious chemical compounds of the formula

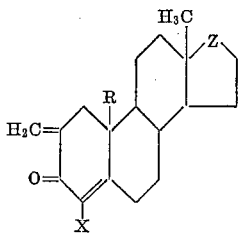

wherein R represents hydrogen or a methyl radical, X represents halogen, and Z represents a carbonyl radical or a radical of the formula

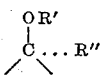

in which R' represents hydrogen or a lower alkanoyl radical and R" represents hydrogen or a lower alkyl or ethynyl radical.

Among the halogens represented by X, especially those of atomic number greater than 9 and less than 53 are preferred, namely, chlorine and bromine. Those skilled in the art will recognize that a lower alkanoyl radical is a radical of the formula —CO-lower alkyl the lower alkyl constituent here, as also in the case of the lower alkyl grouping represented by R", being a monovalent, saturated, acyclic, straight- or branched-chain, hydrocarbon grouping of empirical formula —$C_nH_{2n+1}$ wherein n represents a positive integer less than 8. Typical lower alkyl radicals are methyl, ethyl, propyl, isopropyl, butyl, isobutyl, sec-butyl, tert-butyl, pentyl, neopentyl, hexyl, isohexyl, heptyl, etc.

The compounds to which this invention relates are useful by reason of their valuable pharmacological properties. Thus, for example, they counteract the edema and granuloma-formation characteristic of the inflammatory response to tissue insult.

Preparation of the subject compounds proceeds by heating an alcoholic solution of an appropriate epoxide

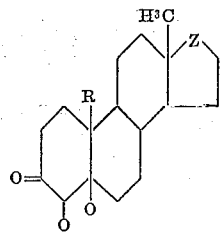

(R and Z being defined as before) with aqueous formaldehyde in the presence of a mild base such as sodium acetate or sodium bicarbonate to induce a 2-methylene group, whereupon the epoxide linkage is cleaved with an appropriate hydrohalide

HX (X being defined as before) in aqueous acetone solution and the resultant 4,5-halohydrin spontaneously dehydrates to the desired product. Alternatively, the esters of this invention can be prepared by starting with the corresponding epoxy alcohols, introducing the 2-methylene group as aforesaid, then esterifying with pyridine and the appropriate alkanoic acid anhydride or halide before cleaving the epoxide linkage and dehydrating as aforesaid.

The following examples describe in detail compounds illustrative of the present invention and methods which have been devised for the preparation thereof. However, the invention is not to be construed as limited thereby, either in spirit or in scope, since it will be apparent to those skilled in the art of organic chemistry that many modifications, both of materials and of methods, can be practiced without departing from the purpose and intent of this disclosure. In the examples hereinafter set forth, temperatures are given in degrees centigrade and relative amounts of materials in parts by weight, except as otherwise noted.

EXAMPLE 1

(A) *4β,5β - epoxy - 17β - hydroxy - 2 - methyleneandrostan-3-one.*—To a solution of 492 parts of 4β,5β-epoxy-17β-hydroxyandrostan-3-one in 7840 parts of methanol at room temperature is consecutively added approximately 2700 parts of aqueous 36% formaldehyde and a solution of 366 parts of sodium acetate in 1470 parts of water. The resultant mixture is heated at the boiling point under reflux for 5 hours, then cooled to room temperature and neutralized with 243 parts of glacial acetic acid. The mixture thus obtained is concentrated to ½ volume by vacuum distillation, and the concentrate is diluted with 7 volumes of ice water. Insoluble solids are filtered off, washed with water, and taken up in ether. The ether solution is washed with water, dried over anhydrous sodium sulfate, and stripped of solvent by vacuum distillation. The residue is 4β,5β-epoxy-17β-hydroxy-2-methyleneandrostan-3-one.

(B) *4-chloro-17β-hydroxy-2-methyleneandrost-4-en - 3-one.*—To a solution of 53 parts of 4β,5β-epoxy-17β-hydroxy-2-methyleneandrostan-3-one in 8000 parts of acetone at 20–25° is added, during 10 minutes, 1190 parts of concentrated hydrochloric acid. The resultant mixture is stirred for 1 hour at room temperatures, then concentrated to the point of incipient precipitation by vacuum distillation. The concentrate is diluted with 5 volumes of ice water and the resultant suspension extracted with dichloromethane. The dichloromethane extract is consecutively washed with aqueous 3% sodium bicarbonate and water, dried over anhydrous sodium sulfate, and stripped of solvent by vacuum distillation. The residue is 4-chloro-17β-hydroxy-2-methyleneandrost-4-en-3 - one, having the formula

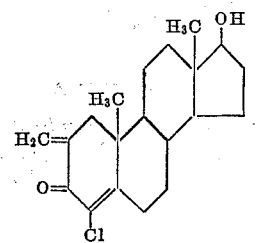

EXAMPLE 2

(A) *17β-acetoxy-4β,5β-epoxy-2 - methyleneandrostan-3-one.*—A solution of 51 parts of 4β,5β-epoxy-17β-hydroxy-2-methyleneandrostan-3-one in 18 parts of acetic anhydride and 24 parts of pyridine is allowed to stand at room temperatures overnight, whereupon insoluble solids are filtered off, consecutively washed with cold pyridine and ether, and crystallized from acetone to give 17β-acetoxy-4β,5β-epoxy-2 - methyleneandrostan - 3 - one melting at 227–230°.

(B) 17 - acetoxy - 4-chloro-2-methyleneandrost-4-en-3-one.—To a solution of 6 parts of 17β-acetoxy-4β,5β-epoxy-2-methyleneandrostan-3-one in 800 parts of acetone at 20° is added, during approximately 5 minutes, 119 parts of concentrated hydrochloric acid. The resultant mixture is stirred for 45 minutes at room temperatures, then concentrated to the point of incipient precipitation by vacuum distillation. The concentrate is diluted with 5 volumes of ice water and the resultant suspension extracted with dichloromethane. The dichloromethane extract is consecutively washed with aqueous 3% sodium bicarbonate and water, dried over anhydrous sodium sulfate, and stripped of solvent by vacuum distillation. The residual oil crystallizes on trituration with ether. Recrystallization from acetone affords 17β-acetoxy-4-chloro-2-methyleneandrost-4-en-3-one melting at 191–194°, the formula of which is

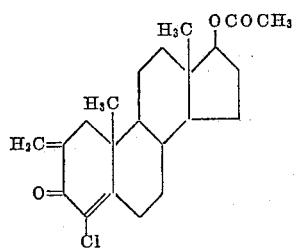

EXAMPLE 3

17 - acetoxy - 4 - bromo - 2 - methyleneandrost - 4-en-3-one.—To a solution of 12 parts of 17β-acetoxy-4β,5β-epoxy-2-methyleneandrostan-3-one in 1920 parts of acetone at 20° is added, during 3 minutes, 337 parts of aqueous 48% hydrogen bromide. The resultant mixture is stirred at room temperatures for 1 hour, whereupon the bulk of the acetone is removed by vacuum distillation and the residual solution diluted with approximately 5 volumes of ice water. The mixture thus obtained is extracted with dichloromethane. The dichloromethane extract is consecutively washed with aqueous 3% sodium bicarbonate and water, dried over anhydrous sodium sulfate, and stripped of solvent by vacuum distillation. The residual oil, on trituration with ether, crystallizes. The product is 17β-acetoxy-4-bromo-2-methyleneandrost-4-en-3-one which, recrystallized from acetone, melts at 169–171°. The product has the formula

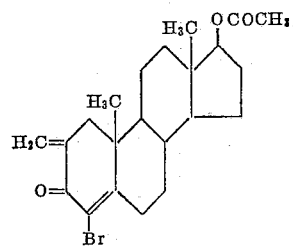

EXAMPLE 4

(A) 4β,5β-epoxy-2-methyleneandrostane-3,17-dione.—To a solution of 489 parts of 4β,5β-epoxyandrostane-3,17-dione in 7800 parts of methanol at room temperature is consecutively added 2700 parts of aqueous 36% formaldehyde and a solution of 366 parts of sodium acetate in 1500 parts of water. The resultant mixture is heated at the boiling point under reflux for 5 hours, then cooled to room temperature and neutralized with glacial acetic acid. The mixture thus obtained is concentrated to ½ volume by vacuum distillation, and the concentrate is partitioned between ice water and ether. The ether phase is separated, washed with water, dried over anhydrous sodium sulfate, and stripped of solvent by vacuum distillation. The residue is 4β,5β-epoxy-2-methyleneandrostane-3,17-dione.

(B) 4-chloro-2-methyleneandrost-4-ene-3,17 - dione.—Substitution of 53 parts of 4β,5β-epoxy-2-methyleneandrostane-3,17-dione for the 4β,5β-epoxy-17β-hydroxy-2-methyleneandrostan-3-one called for in Example 1B affords, by the procedure there detailed, 4-chloro-2-methyleneandrost-4-ene-3,17-dione, the formula of which is

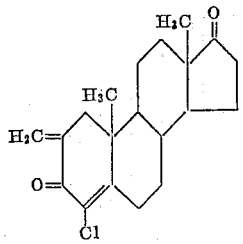

EXAMPLE 5

(A) 4β,5β-epoxy-17β-hydroxy-17α - methyl - 2 - methyleneandrostan-3-one.—Substitution of 515 parts of 4β,5β-epoxy-17β-hydroxy-17α-methylandrostan-3-one for the 4β,5β-epoxyandrostan-3,17-dione called for in Example 4A affords, by the procedure there detailed, 4β,5β-epoxy 17β-hydroxy-17α-methyl-2-methyleneandrostan-3-one.

(B) 4-chloro-17β-hydroxy-17α-methyl - 2 - methyleneandrost-4-en-3-one.—Substitution of 55 parts of 4β,5β-epoxy-17β-hydroxy-17α-methyl-2 - methyleneandrostan-3-one for the 4β,5β-epoxy-17β-hydroxy-2-methyleneandrostan-3-one called for in Example 1B affords, by the procedure there detailed, 4-chloro-17β-hydroxy-17α-methyl-2-methyleneandrost-4-en-3-one, the formula of which is

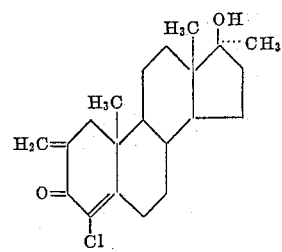

EXAMPLE 6

(A) 4β,5β-epoxy-17β-hydroxy - 2 - methyleneestran-3-one.—To a solution of 36 parts of 4β,5β-epoxy-17β-hydroxyestran-3-one in 576 parts of ethanol at room temperature is consecutively added 194 parts of aqueous 36% formaldehyde and a solution of 27 parts of sodium acetate in 108 parts of water. The resultant mixture is heated at the boiling point under reflux for 5 hours, then cooled to room temperature and neutralized with 18 parts of glacial acetic acid. The mixture thus obtained is concentrated to ½ volume by vacuum distillation, and the residue is diluted with 4000 parts of ice water. Insoluble solids are filtered off and taken up in ether. The ether solution is washed with water, dried over anhydrous sodium sulfate, and stripped of solvent by vacuum distillation. The residue is 4β,5β-epoxy-17β-hydroxy-2-methyleneestran-3-one.

(B) 17β-acetoxy-4β,5β-epoxy - 2 - methyleneestran-3-one.—A mixture of 19 parts of 4β,5β-epoxy-17β-hydoxy-2-methyleneestran-3-one, 60 parts of acetic anhydride, and 80 parts of pyridine is allowed to stand at room temperatures overnight, then poured into 1500 parts of ice water. The gummy precipitate thrown down is filtered off and taken up in ether. The ether solution is successively washed with water, 1% hydrochloric acid, water, aqueous 3% sodium bicarbonate, and water; then dried over anhydrous sodium sulfate; and stripped of solvent by vacuum distillation. The residue is chromatographed on silica gel, using benzene and ethyl acetate as developing solvents. From an eluate comprising 2% ethyl acetate in benzene, on evaporation of solvent and recrystallization of the residue from a mixture of acetone and hexane, 17β-acetoxy-4β,5β-epoxy-2-methyleneestran-3-one is obtained. The product melts at approximately 155–156°.

(C). *17β-acetoxy-4-chloro-2-methyleneestr - 4 - en-3-one.*—Substitution of 58 parts of 17β-acetoxy-4β,5β-epoxy-2-methyleneestran-3-one for the 4β,5β-epoxy-17β-hydroxy-2-methyleneandrostan-3-one called for in Example 1B affords, by the procedure there detailed, 17β-acetoxy-4-chloro-2-methyleneestr-4-en-3-one, having the formula

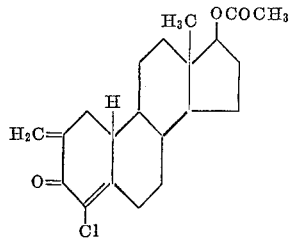

What is claimed is:
1. A compound of the formula

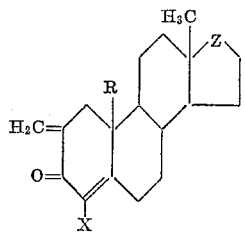

wherein R is selected from the group consisting of hydrogen and the methyl radical, X is halogen of atomic number greater than 9 and less than 53, and Z is selected from the group consisting of the carbonyl radical and radicals of the formula

in which R′ is selected from the group consisting of hydrogen and lower alkanoyl radicals of the formula

and R″ is selected from the group consisting of hydrogen and lower alkyl radicals of the formula

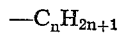

$n$ in the last two formulas being a positive integer less than 8.

2. A compound according to claim 1 in which R represents the methyl radical, X represents halogen of atomic number greater than 9 and less than 53, and Z represents the radical

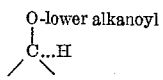

3. A compound according to claim 1 which is 17β-acetoxy-4-chloro-2-methyleneandrost-4-en-3-one.
4. A compound according to claim 1 which is 17β-acetoxy-4-bromo-2-methyleneandrost-4-en-3-one.
5. A compound according to claim 1 which is 4-chloro-2-methyleneandrost-4-ene-3,17-dione.
6. A compound according to claim 1 which is 4-chloro-17β-hydroxy-17α - methyl - 2 - methyleneandrost-4-en-3-one.
7. A compound according to claim 1 which is 17β-acetoxy-4-chloro-2-methyleneestr-4-en-3-one.
8. A compound of the formula

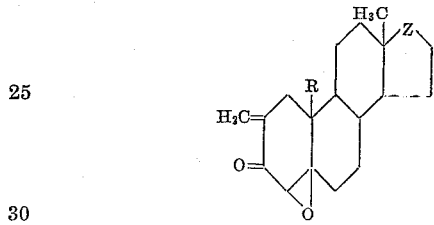

wherein R is selected from the group consisting of hydrogen and the methyl radical and Z is selected from the group consisting of the carbonyl radical and radicals of the formula

in which R′ is selected from the group consisting of hydrogen and lower alkanoyl radicals of the formula

and R″ is selected from the group consisting of hydrogen and lower alkyl radicals of the formula

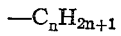

$n$ in the last two formulas being a positive integer less than 8.

References Cited
UNITED STATES PATENTS
3,154,542  10/1964  Bernstein et al. ___ 260—239.55

LEWIS GOTTS, *Primary Examiner.*
T. MESHBESHER, *Assistant Examiner.*